July 23, 1968  PAUL T. CHU ETAL  3,393,690
VISCOSITY CONTROL IN PIPELINE OPERATIONS
Filed Dec. 3, 1964

INVENTORS:
PAUL T. CHU
KENT R. SHELLENE
BY: *Joseph L. Strabala*
THEIR ATTORNEY

United States Patent Office 3,393,690
Patented July 23, 1968

3,393,690
VISCOSITY CONTROL IN PIPELINE OPERATIONS
Paul T. Chu and Kent R. Shellene, Houston, Tex., assignors to Shell Oil Company, New York, N.Y., a corporation of Delaware
Filed Dec. 3, 1964, Ser. No. 415,710
5 Claims. (Cl. 137—13)

ABSTRACT OF THE DISCLOSURE

Apparatus and method for heating fluids containing an oxidizable fluid flowing within a pipeline by in situ oxidation of a portion thereof wherein an oxidant is injected into the pipeline from a controlled source at a selected rate.

Background of the invention

This invention relates to an apparatus and method for heating oxidizable fluids flowing in pipelines, and more particularly, to viscosity control through in situ oxidation of a portion of the fluid flowing in a pipeline.

Description of the prior art

Vast networks of pipelines, particularly in the southwestern portion of the United States, provide a means for the tranmission of petroleum crudes from production areas to refineries or transportation facilities. Similar pipelines also crisscross the other portions of the United States carrying, in addition to petroleum crudes, many other fluids, and in some cases fluid-solid mixtures. The widespread use of pipelines for crude transmission can be appreciated viewing the statistics showing that in 1962 approximately 2,199,226,000 barrels of oil (crude) were transported via interstate and intrastate pipelines.

Whether pipelines are used for the transmission of petroleum crudes, other fluids, or fluid-solid mixtures, a major expense in the transmission thereof is the pumping cost. From the following equation it can be seen that pumping cost in laminar flow will be proportional to the viscosity of the fluid.

$$\Delta P = \frac{32 L V v'}{g D^2}$$

In the Hagen-Poiseuille equation (above)

$\Delta P$ = pressure drop in lbs./sq. ft.
$V$ = velocity ft./sec.
$L$ = length of pipe in ft.
$v'$ = viscosity in lbs./ft./sec.
$g$ = acceleration of gravity in ft./sec./sec.
$D$ = diameter (inside) in ft.

From a perusal of the above equation it can be seen that the viscosity ($v'$) of the fluid being pumped through the pipeline plays a large role in determining the actual pumping cost. For example, if the viscosity doubles it will require twice the work to maintain a constant throughput. Likewise, it can also be shown that, in turbulent flow, the viscosity of the fluid still plays an important role in determining pumping costs.

Since the viscosity of a given fluid is dependent upon the temperature of the fluid, even seasonal changes of temperature at the situs of a pipeline can considerably alter the pumping cost. For example, seasonal temperature change of approximately 25° C. can change the viscosity of naphthalene from 3.3 centipoises at 25° C. to 7.5 centipoises at 0° C., resulting in a more than double increase in the pumping cost of naphthalene at the latter temperature.

In addition, there are some petroleum crudes in the United States, such as certain crudes in the State of Mississippi, which have extremely high viscosity and cannot be moved by pipelines without heating to lessen their viscosity. For example, Baxterville Oil has a viscosity of 17,400 Sabolt Universal seconds (SUS) at 60° F. and a gravity of 16.4° API; being almost a plastic semisolid. In order to pump such a viscous crude through a large diameter pipeline a minimum line temperature of 80° F. must be maintained and pressures as high as 1,000 p.s.i. may be required to achieve useful flow.

One technique for the transmisison of viscous crudes, such as described above, is the use of oil heating equipment at pumping stations. Live steam boilers cooperating with heat exchangers can be used to provide the necessary heat to lower the viscosity of these crudes and make crudes like the Baxterville crudes pumpable. Of course, heating to improve pumpability is not limited to the highly viscous crudes above and such boilers can be used to lower the viscosity of the less viscous crudes to achieve a reduction in pumping costs. Boilers employed in such techniques are usually fueled by natural gas or oil or a combination thereof; and when working with viscous crudes stand-by fuel supplies are a must since a failure of any boiler could be disastrous allowing the crude to freeze in the pipeline. A notable example of a steam heated pipeline is the 152 mile pipeline from Eucutta, Miss., to Mobile, Ala., discussed in World Oil, March 1952, pp. 214–216 in an article entitled, "Steam-Heated Pipeline." The article describes the pipeline as using 150 horsepower boilers, spaced at 9 mile intervals, to prevent the crude from freezing in the pipeline.

While such oil-heating equipment at pumping stations can provide the necessary heat to lower pumping cost and/or improve the pumpability of highly viscous fluids, they are not very efficient since the heat in the combustion unit cannot be fully transferred to the pipeline fluid. Furthermore, boiler and heat exchange equipment are often expensive and the costs of operation and maintenance can be considerable, often requiring a licensed operator. Further, the space between two heating units along the pipeline has to be large to minimize the number of units required. Thus, it is necessary that the crude be raised to a rather high temperature at each station in order to retain sufficient heat to reach the next heating unit. Of course, these high temperatures provide a large temperature differential ($\Delta T$) between the pipeline and the local surroundings resulting in high heat loss and extreme inefficiency.

Summary of the invention

Accordingly, it is an object of the present invention to provide a means for heating fluids in pipelines without heat exchange equipment, such as boilers and cooperating heat exchangers.

It is also an object of the present invention to provide a method whereby the temperature of an oxidizable fluid in a pipeline can be maintained simply, economically and automatically.

Another object of the present invention is to optimize the operational efficiency of a pipeline carrying oxidizable fluids by viscosity control through using the heat generated by in situ oxidation of a portion of the fluid flowing therethrough.

These and other objects of the invention will become apparent from the following description and the accompanying illustrations of the invention.

Broadly, the present invention encompasses apparatus and a method for heat generation within pipelines having fluids containing an oxidizable fluid flowing therethrough by effecting in situ oxidation of a portion of the fluid as it flows through the pipeline. In this manner it is possible to add heat directly to the fluid by the exothermic oxidation reaction without the necessity of heat exchange equipment. Generally, the invention relates to the apparatus and method for injecting an oxidant under circumstances which will cause an exothermic oxidation reaction to take place within the flowing fluid proper to add thermal energy to the fluid. This addition of heat lowers the viscosity and results in improved pumpability. The improved pumpability occurs because the pressure drop for movement of the fluid through the pipeline is proportional to its viscosity and the viscosity is inversely proportional to its temperature, thus an increase in temperature intrinsically reduces pumping costs.

*Description of the preferred embodiments*

Figure 1:
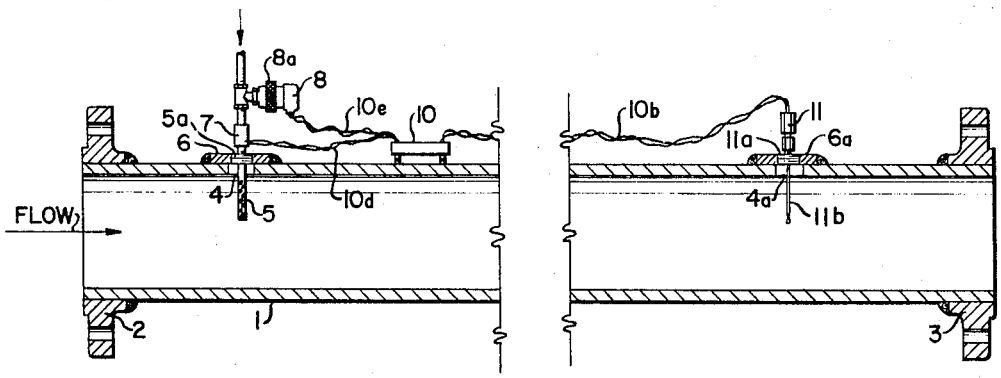
FIGURE 1 is a vertical section view through an adaptation of the invention on a commercial pipeline used for the transport of fluids.

Both method and apparatus of the invention for controlling the viscosity of flowing fluids by the in situ oxidation of the portion thereof can be better understood by referring to the figures. Basically, FIGURE 1 shows one embodiment of the apparatus which consists of cylindrical pipeline section 1 which is adapted to replace a section in a commercial pipeline; or alternatively, this pipeline section 1 could be a portion of an existing commercial pipeline modified for adaptation of the invention.

Pipeline section 1 is shown connected into the pipeline by an upstream connecting flange 2 and a downstream connecting flange 3 so that it will be an integral part of the pipeline. In FIGURE 1, the upstream end of the pipeline section adjacent to upstream flange 2 is provided with a single or multiple orifice 4 communicating with the inside of the pipeline section and each is adapted to receive an oxidant injector tube 5. Generally, the ovidant injector tube 5 can be of various designs and is shown in FIGURE 1 as a simple pipe length having a perforated end projecting radially inwardly into the pipeline section 1. Since obstructions in the pipeline results in turbulence, increasing the pumping power consumption due to frictional losses the oxidant injector tube 5 may be of a more streamlined design to minimize turbulence, but this is not necessary for illustration of the invention.

In order to secure the oxidant injector tube 5 in orifices 4 a ported sealing ring 6 is welded about the orifice and is tapped to receive a threaded boss 5a on the middle portion of the oxidant injector tube 5. Generally, sealing ring 6 will have a tapered thread and as threaded boss 5a in the middle portion of the injector tube is screwed into this threaded portion, it will provide a cooperative seal between the boss and the tapered threaded portion of ring 6 preventing liquids from leaking from the pipeline section 1.

Oxidant injector tube 5, having the one perforated end to allow oxidant to egress from the tube and the boss 5a in the center thereof, is mounted with the perforated end extending radially into the pipeline section 1 by screwing the boss 5a into the tapered threads of sealing ring 6. In the embodiment shown in the drawings, the upper portion of the injector tube is encased by heating jacket 7 so that the oxidant passing through the oxidant injector tube 5 will be heated to a preselected temperature range. Actually, it should be appreciated that other types of heating units can be employed to heat the oxidant passing through the injector tube 5; however, the simple one shown in the drawings is adequate for illustration. Further, there may be situations wherein it would be unnecessary to heat the oxidant passing through the injector tube 5, it being of sufficient activity or mixed with other substances to initiate oxidation by merely contacting it with the fluids flowing in the pipeline section 1.

Mounted on the top of the external projecting end of injector tube 5 is a metering valve 8, shown as a solenoid valve with a manual override ring 8a. This valve 8 is connected between injector tube 5 and a pressurized supply of oxidant to control the amount of oxidant passing through injector tube 5 and thence into the flowing stream within pipeline section 1. Upstream of valve 8 the pressurized source of oxidant (not shown) having a pressure greater than that in the pipeline causes the oxidant to pass through the valve 8 when it is open and into injector tube 5, depending upon the setting of the valve 8. The manual override 8a or actuation of the solenoid of valve 8 by the automatic control system provides for metered oxidant flow into fluids flowing in pipeline section 1. In this manner the amount of oxidant actually entering the pipeline section can be controlled (metered) to achieve the desired amount of heating through the heat generated by in situ exothermic oxidation of a portion of the fluid.

At this point, it should be noted that the oxidant need not be in pure form but can be mixed with other substances, both inert and active. In fact this invention is broad enough to contemplate the injection of a catalyst in finely divided form with the oxidant so as to encourage rapid oxidation of the fluid flowing in the pipeline section 1. Also, additives to cause ignition and actual combustion within the pipeline can be added to the oxidant. Further, since the ambient temperature where the pipeline is operated is known it would be well within the contemplation of this invention to merely meter a calculated amount of oxidant into the pipeline under a condition which would cause the oxidation reaction to take place in order to provide continuous heating of the flowing stream which will be sufficient to keep the flowing stream above a preselected temperature level.

Obviously, a suitable oxidant for the practice of the invention would be oxygen, but it is recognized that numerous other materials which are capable of supplying the necessary oxygen are contemplated.

More specifically, relative to the embodiment of the invention shown in FIGURE 1, the solenoid valve 8 has a knurled threaded ring 8a for manual control which when rotated moves axially along a solenoid body. This ring is suitably interconnected with a valve stem in a solenoid valve in a manner that enables it to override the valve and manually set it for a desired metered oxidant flow. Such manually controlled valve would be used when the invention is used without automatic control devices. In the more sophisticated embodiment shown in FIGURE 1, the solenoid is used to actuate the valve and the knurled ring 8a is backed-off the valve stem so that the valve will close when the solenoid is not energized.

Since in most cases automatic operation of the invention will be desirable, a complete embodiment of an automatic system is shown in FIGURE 1 with the appropriate automatic control unit and transducer. Referring to FIGURE 1, the electrical leads from both the solenoid valve 8 and the heating jacket 7 are connected to a controller 10 which provides current for both the operation of the heating jacket and the solenoid in response to the temperature in the pipeline section 1. The temperature in the pipeline is monitored by thermotransducer 11 and its measurements are carried to the controller through leads 10b.

The thermotransducer 11 can be mounted in the pipeline section 1 in much the same manner as each oxidant injector tube 5 and a number of such transducers can be used. FIGURE 1 shows mounting of the transducer 11 similar to that of tube 5 with an orifice 4a communicating with the inside of pipeline section 1 and a sealing ring 6a secured (welded) to the pipe above the orifice. The sealing ring 6a has a threaded port which is in registry with orifice 4a and the thermotransducer 11 has a threaded boss 11a located in its middle portion which screws into the threaded port of sealing ring 6a when the probe end 11b of the transducer 11 is inserted through the orifice.

Figure 4:
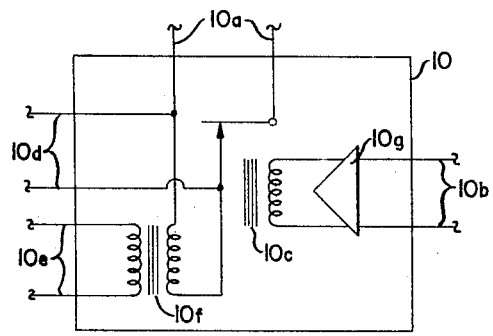
FIGURE 4 is a simple circuit diagram for the electrical control of the automatic operation of the invention.

Referring now to FIGURE 4 which shows the simple electrical controller 10 for the automatic operation of the invention, leads 10b from transducer 11 enter the controller 10 and are connected directly to an operational amplifier 10g. By appropriate biasing in the amplifier, the temperature level at which the operational amplifier will energize relay 10c in the controller can be adjusted. Upon actuation of the relay 10c in controller 10, power from leads 10a is fed to both the solenoid valve 8 and the heating jacket 7 through leads 10e and 10d, respectively. Transformer 10f, located in the controller, is optional depending upon the type solenoid valve used with the invention, and if the solenoid in valve 8 is operable with the line current it would be unnecessary.

Knowing the rate of flow in the pipeline, the kind of fluid flowing in the pipeline section 1 and the temperature of the flowing stream and assuming it is oxidizable or contains an oxidizable fluid, the desired amount of heat can be generated by injecting a given amount of oxidant into the fluids flowing through the pipeline. Persons skilled in the art can easily calculate the necessary amount of oxidant injection for achieving a certain temperature level, knowing the above factors, and set the controller 10 appropriately.

Of course, transducer 11 may be located either up or downstream of the injector tube 5 and, depending upon its location, the amplifier 10g in controller 10 can be set to initiate the appropriate oxidant flow into the pipeline section 1 to raise the temperature accordingly. It should also be appreciated that by modern packaging techniques the controller and solenoid valve 8 could be packaged and encapsulated into a single package especially if the pipeline is to be buried, or alternatively the controller 10 could be located at the surface.

The rate of oxidation determines, to a large extent, the local temperature rise and if all the oxidant is consumed a given amount of heat will be added to the fluid flowing through the pipeline by the exothermic oxidation reaction. Under proper conditions, when oxidant is injected into the pipeline, actual combustion may occur within the pipeline proper. Of course, the rate of oxidation is dependent upon the temperatures, catalysts present, and many other factors which are well within the purview of persons skilled in the art. Naturally, it may be necessary to use banks of injector tubes 5 to achieve the desired heating and they can be arranged so that they act cooperatively, such as aligning them axially so that the heat generated by the upstream tubes encourage oxidation in the vicinity of the downstream tubes.

Figure 2:
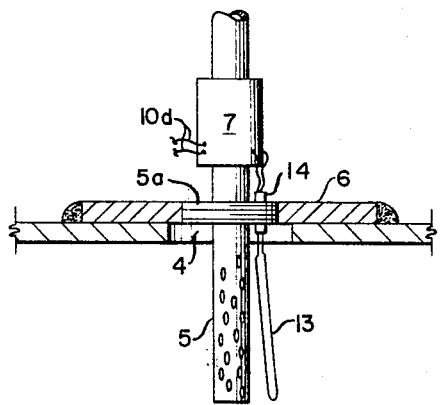
FIGURES 2 and 3 show an enlarged view of the oxidant injector tube with alternate embodiments of the invention incorporated therein.

It is also recognized that the rate of oxidation may be increased by other means used without heating jacket 7 or cooperatively therewith. For example, referring to FIGURES 2 and 3, alternative embodiments of the invention are shown which employ means cooperating with heating jacket 7 in order to encourage rapid oxidation. In FIGURE 2, a hot wire 13 is connected to the same current source as heating jacket 7 through the jacket and is disposed downstream and adjacent to injector tube 5 having power leads passing through insulating plug 14 in the threaded boss 5a to the jacket 7. When oxidant is being introduced into the flowing in the pipeline through the perforations in the end of the oxidant injector tube 5, current passing through the heating wire 13 causes it to become very hot thereby initiating or encouraging rapid oxidation of the oxidant with the oxidizable fluid or portion thereof flowing through pipeline section 1.

Figure 3:
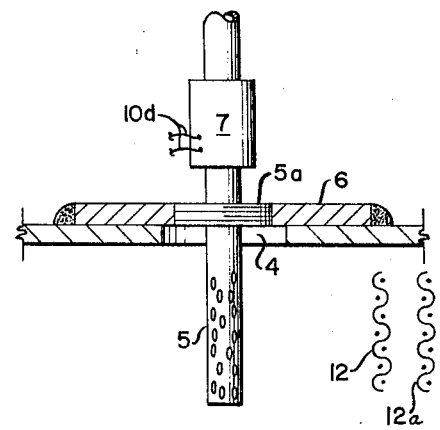

Another embodiment is shown in FIGURE 3 in which two small catalytic coated screens 12 and 12a are placed downstream of injector tube 5 and in close proximity thereto. The oxidant emerging from the perforation oxidant injector tube 5 mixes with the fluids flowing through pipeline section 1 and immediately contacts the catalytically coated screens 12 and 12a which catalyze the rate of oxidation. It should be emphasized that such embodiments can be used cooperatively with the heating jacket 7 or can be used individually or all collectively depending upon the type fluid being transported to the pipeline, the temperature of the fluid, the rate of reaction with the oxidant, etc.

Having described the apparatus used in this invention, it will be apparent that the method of the invention involves in situ heating of fluids containing an oxidizable fluid flowing through pipelines by the oxidation of the portion thereof. Since the oxidation of the fluid is an exothermic reaction, it is only necessary to add sufficient oxidant to generate the necessary amount of heat to raise the temperature of the fluid in the pipeline to the desired amount. Obviously, it may be desirable to encourage the rate of oxidation through the use of heating elements, such as heater 7, heated wires, such as hot wire 13, and catalytically coated screens such as the coated screens 12 and 12a shown in FIGURE 3. Actually, it may be desirable to effect actual combustion of the oxidant with the oxidizable portion of the fluid flowing through the pipeline, i.e., actual burning within the stream proper and all the above devices are helpful in encouraging the rapid oxidation rates which are necessary for actual combustion.

The above description of the invention and method is merely intended to be explanatory thereof and is not intended as limitations thereon. It can be appreciated that the broad concept of this invention offers considerable advantages over the use of boilers and the like to heat the fluids flowing through pipelines when the fluid flowing in the pipeline has an oxidizable fluid contained therein or is itself oxidizable. Changes in the described apparatus are well within the skill in the art and can be made without departing from the scope of the invention.

We claim:
1. A method of reducing the viscosity for facilitating flow by heating of a viscous liquid containing an oxidizable fluid flowing through a pipeline by in situ oxidation of a portion thereof comprising the steps of:
   injecting an oxidant into the path of the flowing liquid; and
   controlling the amount of said oxidant so as to cause said oxidant to react rapidly in situ with a portion of said oxidizable fluid flownig therein and substantially increase the temperature of the flowing liquid by substantial exothermic reaction of the oxidant with the oxidizable fluid.

2. The method of claim 1 wherein the step of causing said oxidant to react rapidly with said oxidizable fluid includes the step of heating the oxidant prior to injection into the path of the flowing liquid.

3. The method of claim 1 wherein the step of causing said oxidant to react rapidly with said oxidizable fluid includes the step of creating combustion between the oxidant and the oxidizable fluid in the presence of a heated element.

4. The method of claim 1 wherein the step of injecting an oxidant into the path of the flowing liquid includes the step of injecting said oxidant in the presence of a catalyst so as to increase the rate of oxidation.

5. The method of claim 1 further including the step of automatically controlling the injecting of the oxidant in response to changes in temperature of the liquid flowing through the pipeline.

References Cited

UNITED STATES PATENTS

| | | | |
|---|---|---|---|
| 1,016,958 | 2/1912 | Roberts | 137—13 |
| 1,454,485 | 5/1923 | Persch | 137—13 |
| 1,893,372 | 1/1933 | Kryzanowsky | 23—288.91 |
| 2,206,553 | 7/1940 | Nagel | 158—117.5 |
| 2,866,602 | 12/1958 | Dailey | 137—90 X |
| 2,981,747 | 4/1961 | Lang | 208—3 |

ALAN COHAN, *Primary Examiner.*